(No Model.) 2 Sheets—Sheet 1.
C. LUSTED, Sr.
SLEIGH ATTACHMENT FOR VEHICLES.
No. 575,657. Patented Jan. 19, 1897.
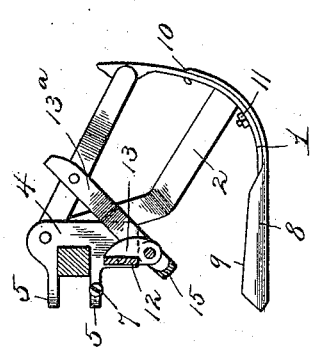
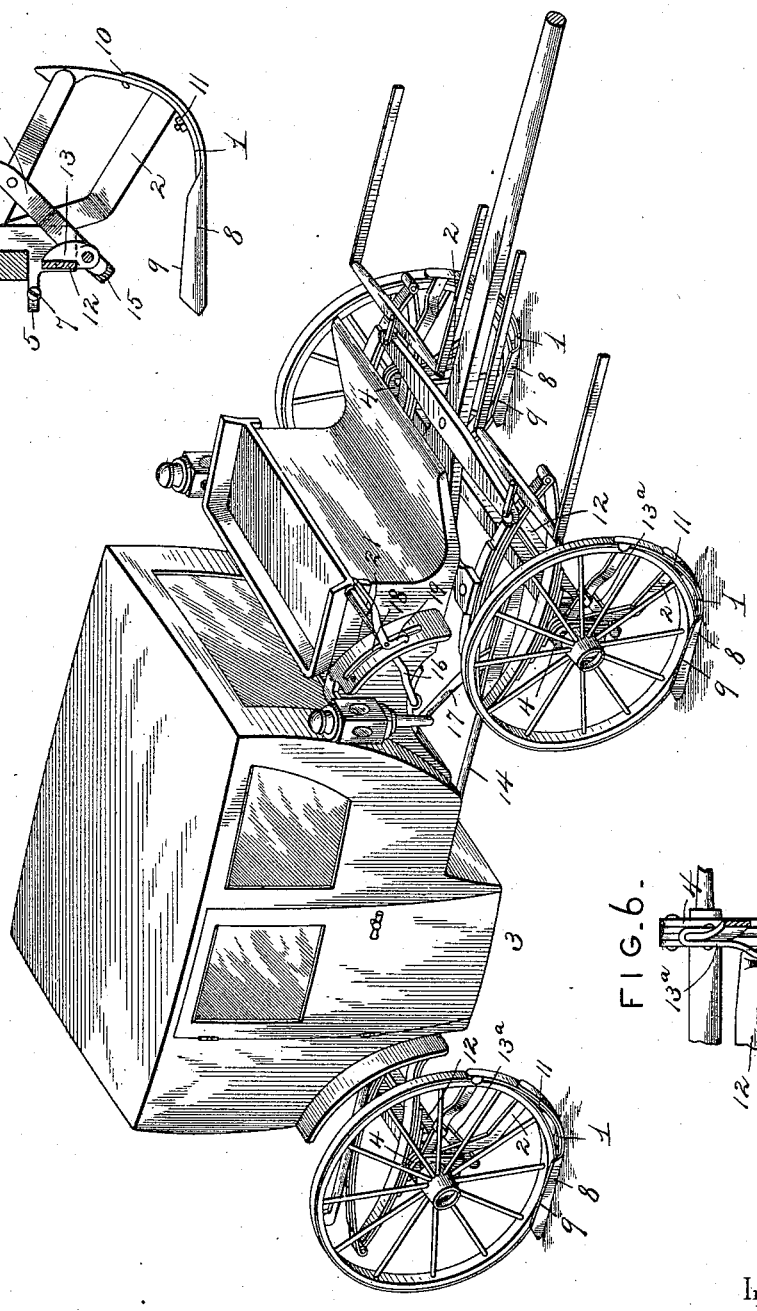
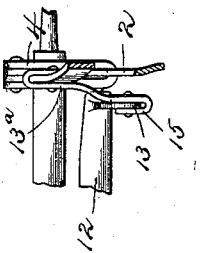
Witnesses
Harry L. Amer.
N. H. Riley
Inventor
Charles Lusted, Sr.
By his Attorneys,
C. A. Snow & Co.

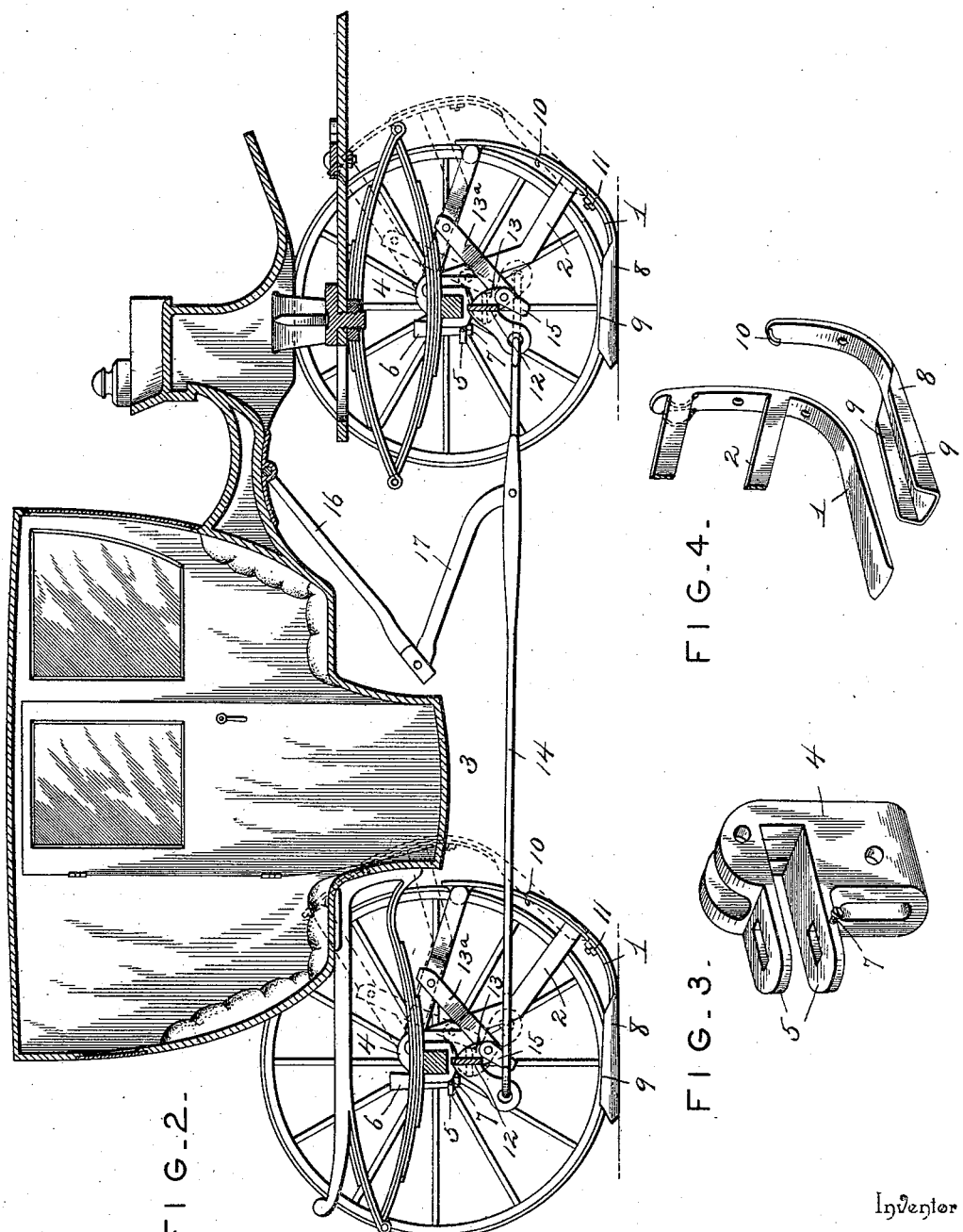

UNITED STATES PATENT OFFICE.

CHARLES LUSTED, SR., OF LAFAYETTE, LOUISIANA.

SLEIGH ATTACHMENT FOR VEHICLES.

SPECIFICATION forming part of Letters Patent No. 575,657, dated January 19, 1897.

Application filed January 30, 1896. Serial No. 577,395. (No model.)

*To all whom it may concern:*

Be it known that I, CHARLES LUSTED, Sr., a citizen of the United States, residing at Lafayette, in the parish of Lafayette and State of Louisiana, have invented a new and useful Sleigh Attachment, of which the following is a specification.

The invention relates to improvements in sleigh attachments for vehicles.

The object of the present invention is to improve the construction of sleigh attachments for vehicles, and to provide a simple, inexpensive, and efficient one capable of being readily applied to carriages and other vehicles and of being brought into and out of operation without necessitating a driver leaving his seat.

A further object of the invention is to provide a sleigh attachment which, when thrown out of operation, will have its runners arranged a sufficient distance from the vehicle-wheels to prevent any friction or clogging through accumulation of mud on the said wheels.

The invention consists in the construction and novel combination and arrangement of parts hereinafter fully described, illustrated in the accompanying drawings, and pointed out in the claims hereto appended.

In the drawings, Figure 1 is a perspective view of a vehicle provided with a sleigh attachment constructed in accordance with this invention, the runners being in operative position. Fig. 2 is a longitudinal sectional view of the same, the runners being shown in operative position in full lines and off the wheels in dotted lines. Fig. 3 is a detail perspective view of one of the bearing-brackets. Fig. 4 is a detail view of one of the runners, the shoe and the runner proper being separated. Figs. 5 and 6 are detail views illustrating the manner of mounting the runners.

Like letters of reference designate corresponding parts in all the figures of the drawings.

1 designates a series of runners provided with substantially radially-disposed upper and lower arms 2 and detachably connected with a vehicle 3 by means of bearing-brackets 4, mounted on the axles of the vehicle and located adjacent to the wheels. Each bearing-bracket, which is constructed of suitable metal, has a vertical opening forming two sides and is provided with substantially horizontally-disposed arms 5, receiving an axle between them and located above and below the same. The arms 5 are provided with openings for the reception of a vertically-disposed tapering key 6, located in rear of the axle and engaged by a clamping-screw 7, which confines the key in the openings of the arms 5.

The substantially radially-disposed arms 2 of the runners 1 extend forward from the adjacent axle and have their upper terminals pivotally connected to the adjacent bearing-bracket between the sides thereof eccentrically of the wheel, whereby when the runner is swung upward, as illustrated in dotted lines in Fig. 2 of the accompanying drawings, it will be carried clear of the wheel and in advance of the same, and when swung downward into operative position it will be carried into close contact with the wheel. By this construction the runner is firmly held in operative position and is prevented, when not in use, from catching mud and clogging the wheels and increasing the weight of the vehicle. Each runner is provided with a shoe 8, having upwardly-extending side flanges 9, embracing the wheel at the bottom thereof, to prevent any lateral movement of the runner when the latter is in operative position. The shoe receives the wear, is provided at its front end with a tongue projection 10, and is secured intermediate of its ends to the runner by a bolt 11, or other suitable fastening device, passing through a perforation of the runner and having its head countersunk into the shoe. The projection 10 is hooked into a perforation of the runner, and the latter may be readily removed when worn and another shoe may be quickly applied.

Each pair or set of runners is connected with a transverse rock-shaft 12, journaled at its ends in suitable bearings on the brackets 4 and provided adjacent to the same with arms 13, which are connected by link-bars 13ª with the upper arms of the runners, whereby a toggle connection is provided and the operation rendered positive and reliable. The terminals of the link-bar 13ª are bent upon themselves to provide loops or keepers for the arms of the rock-shaft and the runners. The rock-shafts of the front and rear axles are connected by a longitudinally-disposed bar 14, movably connected with depending cylindrically-arranged arms 15 of the side shafts and producing a simultaneous operation of the runners of the front and rear wheels.

The wheel attachment is operated by a lever 16, fulcrumed intermediate of its ends on the vehicle and connected at its lower end with the bar 14 by a link-bar 17. The upper arm or portion of the operating-lever is arranged in an opening or slot of a segmental ratchet 18 and is located at any desired adjustment by a spring-actuated latch-lever 19, engaging perforations of the ratchet. The latch-lever, which is substantially L-shaped, is fulcrumed at its angle on the operating-lever and has its upper arm engaged by a spring 21. The operating-lever is located at one side of the vehicle and has its handle portion arranged at one end of the driver's seat within easy reach, in order that the sleigh attachment may be operated from that point. When it is desired to lift the runners, the vehicle should be backed slightly, sufficiently to free the runners, and then the latter may be readily swung upward by means of the operating-lever.

It will be seen that the sleigh attachment is simple and inexpensive in construction and positive and reliable in operation, that it is applicable to all classes of vehicles, and that it will enable a vehicle to be readily converted into a sleigh without necessitating the driver leaving his seat. It will also be apparent that the runners of the sleigh attachment, when thrown out of operation, are carried away from the vehicle-wheels to prevent any liability of the vehicle being retarded or the wheels becoming clogged by an accumulation of mud thereon.

Changes in the form, proportion, and minor details of construction may be resorted to without departing from the principle or sacrificing any of the advantages of the invention.

What I claim is—

1. In a sleigh attachment for vehicles, the combination with an axle, of bearing-brackets mounted thereon, runners provided with upper and lower radially-disposed arms pivoted to the bearing-brackets eccentrically of the axle, a transverse rock-shaft journaled on the bearing-brackets, located beneath the axle and provided with arms, and the inclined link-bars pivoted to the arms of the rock-shaft and to the upper arms of the runners and forming a toggle connection between the runners and the rock-shaft, substantially as described.

2. In a sleigh attachment for vehicles, the combination of a bearing-bracket provided with a vertical opening to form two sides and having horizontally-disposed arms extending rearward from the bearing-bracket, adapted to embrace an axle and provided with openings, a tapering key arranged in the openings of the arms and adapted to secure the bearing-bracket to the axle, a runner provided with arms pivoted in the vertical opening of the bracket, a rock-shaft journaled on the bracket and having an arm, and a link-bar connected with the arm of the rock-shaft and an arm of the runner, substantially as described.

3. In a sleigh attachment, the combination of a runner provided with a perforation, a shoe having a hook-shaped projection passing through the perforation of the runner and interlocked with the latter, said shoe being provided at opposite sides with flanges receiving the runner and adapted to embrace a wheel, and a fastening device for securing the shoe to the runner, substantially as described.

In testimony that I claim the foregoing as my own I have hereto affixed my signature in the presence of two witnesses.

CHARLES LUSTED, SR.

Witnesses:
C. H. LUSTED,
CHAS. D. CAFFERY.